United States Patent
Hordos

(10) Patent No.: US 9,556,078 B1
(45) Date of Patent: Jan. 31, 2017

(54) GAS GENERATOR

(75) Inventor: Deborah L. Hordos, Troy, MI (US)

(73) Assignee: TK Holdings Inc., Armada, MI (US)

( * ) Notice: Subject to any disclaimer, the term of this patent is extended or adjusted under 35 U.S.C. 154(b) by 1173 days.

(21) Appl. No.: 12/384,632

(22) Filed: Apr. 7, 2009

Related U.S. Application Data

(60) Provisional application No. 61/123,296, filed on Apr. 7, 2008.

(51) Int. Cl.
| | | |
|---|---|---|
| *C06B 45/10* | (2006.01) | |
| *C06B 29/22* | (2006.01) | |
| *C06B 31/28* | (2006.01) | |
| *C06B 29/02* | (2006.01) | |
| *C06B 31/02* | (2006.01) | |

(52) U.S. Cl.
CPC ............ *C06B 45/10* (2013.01); *C06B 29/02* (2013.01); *C06B 29/22* (2013.01); *C06B 31/02* (2013.01); *C06B 31/28* (2013.01)

(58) Field of Classification Search
CPC .......... C06B 45/10; C06B 31/28; C06B 31/02; C06B 29/22; C06B 29/02
See application file for complete search history.

(56) References Cited

U.S. PATENT DOCUMENTS

| | | | |
|---|---|---|---|
| 2,985,979 A | 5/1961 | Doyle et al. | |
| 3,111,899 A | 11/1963 | Tiedmann | |
| 3,558,285 A | 1/1971 | Ciccone et al. | |
| 3,711,115 A | 1/1973 | Lohr | |
| 3,785,149 A | 1/1974 | Timmerman | |
| 3,787,010 A | 1/1974 | Meranshian et al. | |
| 3,849,923 A | 11/1974 | Hawkins, Jr. | |
| 3,862,866 A | 1/1975 | Timmerman et al. | |
| 3,880,595 A | 4/1975 | Timmerman | |
| 3,902,934 A | 9/1975 | Timmerman | |
| 3,923,884 A | 12/1975 | Yonemitsu et al. | |
| 4,244,295 A | 1/1981 | Shaffer | |
| 4,301,732 A | 11/1981 | VanSickle | |
| 4,337,352 A | 6/1982 | Naumann | |
| 4,943,086 A * | 7/1990 | Cunningham | ................ 280/741 |
| 5,084,118 A | 1/1992 | Poole | |
| 5,139,588 A | 8/1992 | Poole | |
| 5,221,765 A | 6/1993 | Patil et al. | |
| 5,380,380 A | 1/1995 | Poole et al. | |
| 5,386,775 A | 2/1995 | Poole et al. | |
| 5,460,668 A | 10/1995 | Lyon | |

(Continued)

FOREIGN PATENT DOCUMENTS

| | | |
|---|---|---|
| DE | 19950311 A1 | 10/1999 |
| WO | WO 97/29151 | 8/1997 |

OTHER PUBLICATIONS

Office Action U.S. Appl. No. 11/479,493, filed Jun. 30, 2009, Mailed Dec. 11, 2008 (126).

(Continued)

*Primary Examiner* — Aileen B Felton
(74) *Attorney, Agent, or Firm* — L.C. Begin & Associates, PLLC.

(57) ABSTRACT

A gas generator is provided, the gas generator having a propellant cushion that prevents movement of propellant tablets or grains by providing a bias thereagainst. Furthermore, the cushion is formed from an auto-igniting material thereby functioning not only as a cushion, but also as an enhanced auto-ignition charge.

19 Claims, 2 Drawing Sheets

(56) References Cited

U.S. PATENT DOCUMENTS

| | | | |
|---|---|---|---|
| 5,460,671 A | 10/1995 | Khandhadia | |
| 5,514,230 A | 5/1996 | Khandhadia et al. | |
| 5,518,054 A | 5/1996 | Mitson et al. | |
| 5,531,941 A | 7/1996 | Poole | |
| 5,538,567 A | 7/1996 | Henry, III et al. | |
| 5,538,568 A | 7/1996 | Taylor et al. | |
| 5,545,272 A | 8/1996 | Poole et al. | |
| 5,567,905 A | 10/1996 | Barnes et al. | |
| 5,670,740 A | 9/1997 | Barnes et al. | |
| 5,682,014 A | 10/1997 | Highsmith et al. | |
| 5,756,929 A | 5/1998 | Lundstrom et al. | |
| 5,763,821 A | 6/1998 | Wheatley | |
| 5,783,773 A | 7/1998 | Poole | |
| 5,831,207 A * | 11/1998 | Seeger et al. | 149/18 |
| 5,854,442 A | 12/1998 | Scheffee et al. | |
| 5,861,571 A | 1/1999 | Scheffee et al. | |
| 5,872,329 A | 2/1999 | Burns et al. | |
| 5,962,808 A | 10/1999 | Lundstrom | |
| 6,007,647 A | 12/1999 | Burns et al. | |
| 6,074,502 A | 6/2000 | Burns et al. | |
| 6,077,371 A | 6/2000 | Lundstrom et al. | |
| 6,210,505 B1 | 4/2001 | Khandhadia et al. | |
| 6,287,400 B1 | 9/2001 | Burns et al. | |
| 6,306,232 B1 | 10/2001 | Khandhadia et al. | |
| 6,464,254 B2 | 10/2002 | Chikaraishi et al. | |
| 6,475,312 B1 | 11/2002 | Burns et al. | |
| 6,517,647 B1 | 2/2003 | Yamato | |
| 6,588,797 B1 | 7/2003 | Blomquist | |
| 6,620,266 B1 | 9/2003 | Williams et al. | |
| 6,682,616 B1 | 1/2004 | Yamato et al. | |
| 6,752,421 B2 | 6/2004 | Khandhadia et al. | |
| 6,779,812 B2 | 8/2004 | Ishida et al. | |
| 6,789,485 B2 * | 9/2004 | Moquin et al. | 102/530 |
| 6,800,154 B1 | 10/2004 | Carey et al. | |
| 6,887,326 B2 | 5/2005 | Williams et al. | |
| 6,918,976 B2 | 7/2005 | Sato et al. | |
| 7,005,459 B2 | 2/2006 | Hekal | |
| 7,094,296 B1 | 8/2006 | Williams et al. | |
| 7,134,690 B2 | 11/2006 | Furusawa et al. | |
| 7,575,648 B1 | 8/2009 | Burns et al. | |
| 2003/0024618 A1 | 2/2003 | Wu et al. | |
| 2004/0232679 A1 | 11/2004 | Kubo et al. | |
| 2005/0067074 A1 | 3/2005 | Hinshaw et al. | |
| 2005/0161135 A1 | 7/2005 | Williams et al. | |
| 2005/0230017 A1 | 10/2005 | Williams et al. | |
| 2005/0235863 A1 | 10/2005 | Stevens | |
| 2005/0257866 A1 | 11/2005 | Williams et al. | |
| 2005/0263223 A1 | 12/2005 | Halpin et al. | |
| 2005/0272873 A1 | 12/2005 | Miller et al. | |
| 2006/0022443 A1 | 2/2006 | Stevens et al. | |
| 2006/0043716 A1 | 3/2006 | Quioc et al. | |
| 2006/0102259 A1 * | 5/2006 | Taylor et al. | 149/45 |
| 2006/0118218 A1 | 6/2006 | Burns et al. | |
| 2006/0219340 A1 | 10/2006 | Dunham et al. | |
| 2006/0220362 A1 | 10/2006 | Hordos | |
| 2007/0034307 A1 | 2/2007 | Hordos | |
| 2007/0040167 A1 | 2/2007 | Miller et al. | |
| 2007/0044675 A1 | 3/2007 | Burns et al. | |
| 2007/0084531 A1 | 4/2007 | Halpin et al. | |
| 2007/0113940 A1 | 5/2007 | Burns et al. | |
| 2007/0175553 A1 | 8/2007 | Burns et al. | |
| 2008/0099111 A1 | 5/2008 | Miller et al. | |
| 2008/0149232 A1 | 6/2008 | Newell | |
| 2008/0271825 A1 | 11/2008 | Halpin et al. | |
| 2009/0008003 A1 | 1/2009 | Burns et al. | |
| 2009/0199937 A1 | 8/2009 | Miller et al. | |

OTHER PUBLICATIONS

Office Action U.S. Appl. No. 11/479,493, filed Jun. 30, 2009, Mailed Feb. 3, 2009 (126).

Office Action U.S. Appl. No. 11/479,493, filed Jun. 30, 2009, Mailed Aug. 4, 2009 (126).

Office Action U.S. Appl. No. 11/497,149, filed Jul. 31, 2006, Mailed Aug. 25, 2009 (121).

Office Action U.S. Appl. No. 11/218,191, filed Aug. 31, 2005, Mailed Jun. 4, 2007 (98).

Office Action U.S. Appl. No. 11/218,191, filed Aug. 31, 2005, Mailed Nov. 26, 2007 (98).

* cited by examiner

US 9,556,078 B1

GAS GENERATOR

CROSS-REFERENCE TO RELATED APPLICATIONS

The present application claims the benefit of U.S. Application Ser. No. 61/123,296 having a filing date of Apr. 7, 2008.

TECHNICAL FIELD

The present invention relates generally to pyrotechnic gas generators for inflatable restraint devices, and more particularly to such a gas generator having a propellant cushion for biasing a resistance against the propellant bed to prevent fracture of propellant grains and/or tablets therein.

BACKGROUND OF THE INVENTION

Inflatable restraint systems or "airbag" systems have become a standard feature in many new vehicles. These systems have made significant contributions to automobile safety, however, as with the addition of any standard feature, they increase the cost, manufacturing complexity and weight of most vehicles. Technological advances addressing these concerns are therefore welcomed by the industry. In particular, the gas generator or inflator used in many occupant restraint systems tends to be the heaviest, most complex component. Thus, simplifying the design and manufacturing of airbag inflators, while retaining optimal function, has long been a goal of automotive engineers.

Typical inflators are constructed having an elongate metallic body. Because many inflators utilize pyrotechnic gas generant compounds to produce inflation gas for the associated airbag, the inflator structure is necessarily robust, making such inflators correspondingly heavy. An increasingly popular and useful inflator style uses multiple, selectively activated gas generant charges. In such systems, the multiple propellant beds disposed within the inflator body may be ignited either simultaneously or serially. Certain vehicle and occupant parameters may justify firing both propellant beds in the event of a crash. Other scenarios may be best addressed by firing only one of the propellant charges, or firing the charges sequentially, with a delay between the two events. In order to avoid sympathetic ignition of one charge during firing of the other, the combustion chambers must generally be fluidly isolated. The relatively large forces on the inflator generated by the combustion of pyrotechnics therein requires the internal partitions and other structural members of the inflator that fluidly isolate the charges to be relatively sturdy, further adding to the weight of the inflator.

Various schemes have developed for constructing sturdy, internally partitioned multi-chamber inflators. One approach involves inserting a partition into the interior of the inflator, then crimping or roll-forming the inflator body to retain the partition. This approach has proven effective, however, in many circumstances a heavier-duty/thicker inflator body must be used that will withstand the crimping and/or roll forming process. Such inflator bodies can be quite heavy, and the manufacturing process is relatively complicated given processing steps necessary to secure the internal partitions.

Yet another concern is repeatability of performance of the gas generator. Propellant springs or cushions are employed to prevent fracture of the propellant thereby maintaining a relatively constant propellant surface area of combustion. Optimizing the weight and size of the inflator, while providing the necessary multi-functionality of the inflator constituents remains an ongoing challenge.

SUMMARY

It is an object of the present invention to provide a gas generator having a propellant cushion that prevents movement of the propellant tablets or grains by providing a bias thereagainst. Furthermore, the cushion is formed from an auto-igniting material thereby providing the requisite auto-ignition of the inflator during a bonfire event for example.

DETAILED DESCRIPTION OF PREFERRED EMBODIMENTS

Figure 1:
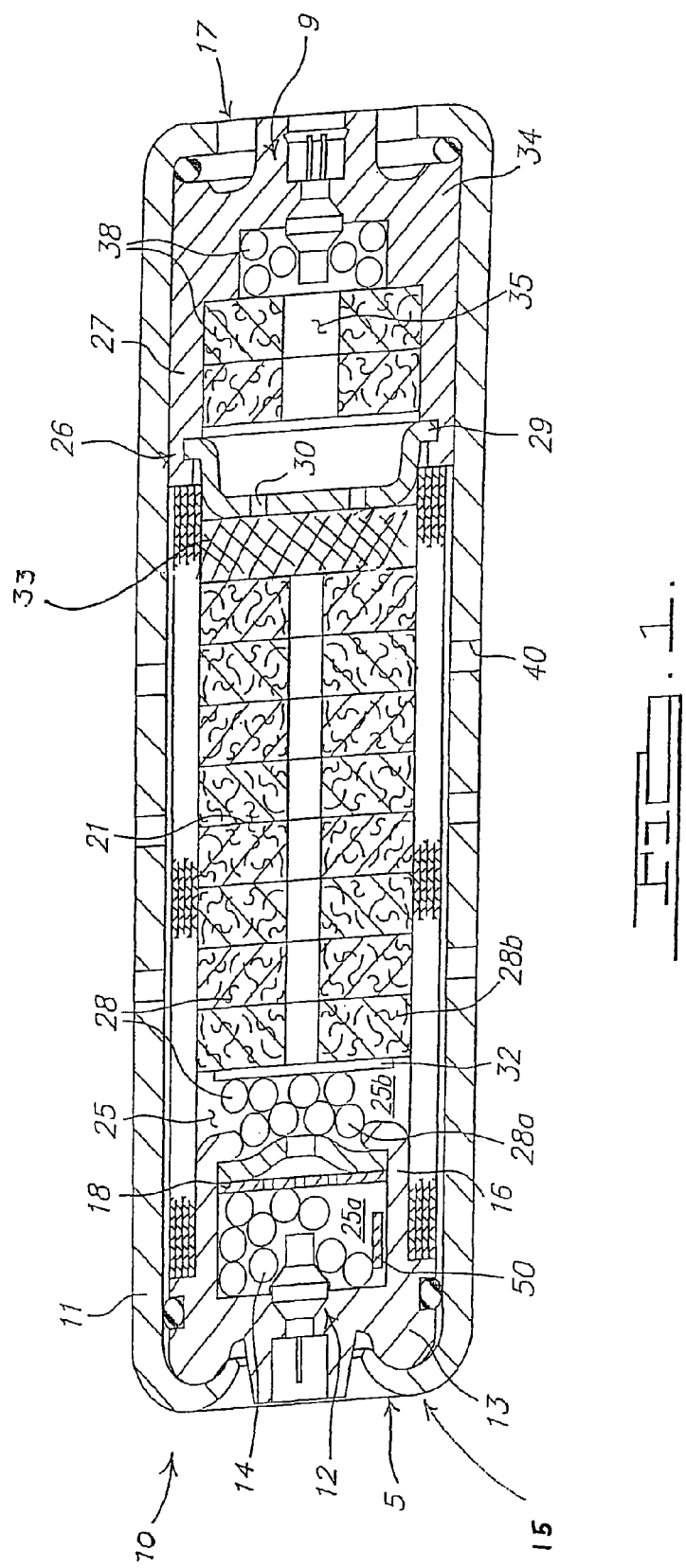
FIG. 1 is a partial side view of an inflator according to one embodiment of the present invention.

Referring to FIG. 1, there is shown an exemplary gas generator or inflator 10 according to an embodiment of the present invention. Inflator 10 is designed for use with an inflatable restraint system in an automobile, supplying inflation gas for inflation of a conventional airbag cushion, a function well known in the art. Inflator 10 utilizes two propellant charges, described herein, that are ignited in separate combustion chambers, and discharge inflation gas via a common plenum 21. Exemplary inflator 10 further provides independently operable initiators for igniting the respective propellant charges, imparting significant variation to the available operating schemes for the inflator. For instance, both sequential and serial firing of the two charges is possible, depending on the optimal deployment of the associated airbag. It is contemplated that inflator 10 will find greatest utility in passenger-side airbag systems; however, other applications are possible without departing from the scope of the present invention. All the components of the present invention are formed from known materials that are readily available commercially, and are made by known processes.

Inflator 10 includes an elongate pressure vessel or inflator body 11, preferably a hollow steel cylinder. Inflator body 11 is characterized by a first end 15 and a second end 17, and defines a plurality of inflation apertures 40 that allow fluid communication between the exterior of the inflator body and plenum 21. A first end closure 13 is positioned at first end 15 of inflator body 11, preferably creating a fluid seal therewith. A second end closure 34 is preferably positioned at second end 17, also preferably creating a fluid seal with inflator body 11. Closures 13 and 34 are preferably metallic, however, they might be made from another suitable material such as a plastic, a ceramic, or a composite material. First end 15 and second end 17 are preferably crimped inwardly to hold first and second closures 13 and 34 in place, however, some other suitable method such as welding or mating threads on inflator body 11 and the respective closures might be used. In addition, rubber O-rings may be snap-fit around closures 13 and 34, creating or enhancing seals with inflator body 11.

Inflator 10 includes a first combustion chamber 25, within which a quantity of gas generant material or first propellant charge 28 is placed. In a preferred embodiment, chamber 25 comprises a significant proportion of the interior of inflator body 11, defined in part by longitudinal walls of inflator body 11, and in part by first end closure 13. Plenum 21 is the region of inflator body 11 whereby inflation gas is passed to apertures 40. Thus, chamber 25 and plenum 21 are at least partially coextensive. Stated another way, plenum 21 may be loosely defined as the portion of chamber 25 that occupies the middle region of the interior of inflator body 11. The phrase "at least partially coextensive" should be understood to include designs wherein chamber 25 is subdivided by foils, burst shims, etc., as described herein, as well as designs wherein chamber 25 is uninterrupted by such features. First end closure 13 preferably includes a cylindrical extension 16 wherein a perforated disk 18 is positioned, separating chamber 25 into two sub-chambers 25a and 25b. An initiator assembly 12, preferably including a conventional igniter or squib, is positioned at first end 15, and preferably mounted in first end closure 13 such that it can ignite compositions in chamber 25. A second initiator assembly 9, also preferably including a conventional igniter or squib, is positioned at second end 17.

Propellant charge 28 may be any suitable gas generant composition known in the art, preferably a non-azide composition such as phase stabilized ammonium nitrate combined with a known fuel. Exemplary, but not limiting formulations are described in U.S. Pat. Nos. 5,872,329, 5,756,929, and 5,386,775. In a preferred embodiment, propellant charge 28 is provided in both tablet 28a and wafer 28b forms, both of which are illustrated in FIG. 1. The tablets 28a and wafers 28b may be different compositions, but are preferably the same material in different, commercially available forms. In a preferred embodiment, a retainer disk 32 separates tablets 28a from wafers 28b. Disk 32 may be made from a relatively porous material such that a flame front or heat from ignition of tablets 28a can ignite wafers 28b, or it may be made from a known material that allows ignition of wafers 28b by heat convection from the burning of tablets 28a. A quantity of booster propellant 14 is preferably placed in sub-chamber 25a, and is ignitable via initiator 12 in a conventional manner to ignite and enhance the burn characteristics of the first propellant charge 28a and 28b.

In accordance with the present invention, a cushion 33 is positioned between propellant tablets 28b and a cap 29, thereby inhibiting fracture of the tablets 28b. In further accordance of the present invention, the cushion 33 is formed from a composition containing a polymeric binder (such as silicone) at about 20-about 60 wt %, an oxidizer selected from known oxidizers at about 20-about 60 wt %, nitrocellulose at about 20-about 80 wt %, and, if desired, about 0.1-about 50 wt % of a desiccating material such as synthetic zeolites, calcium oxide, and/or calcium sulfate may be provided. It will be appreciated that cushion 33 may also be positioned anywhere within the inflator 10, and may provide a resilient support wherever required therein. Accordingly, the shape of the cushion 33 is not limited to the exemplary structure shown. In still a further advantage, the cushion is made from a lightweight material rather than a typical wire mesh material, thereby reducing the overall weight of the gas generator 10 or gas generating system 10 associated therewith.

In accordance with the present invention, a cushion 33 is positioned between propellant tablets 28b and a cap 29, thereby inhibiting fracture of the tablets 28b. In further accordance of the present invention, the cushion 33 is formed from a composition containing a polymeric binder (such as silicone) at about 20-about 60 wt %, an oxidizer selected from known oxidizers at about 20-about 60 wt %, nitrocellulose at about 20-about 80 wt %, and, if desired, about 0.1-about 50 wt % of a desiccating material such as synthetic zeolites, calcium oxide, and/or calcium sulfate may be provided. Silicones as polymeric binders are preferred because of their favorable effluents, their flexibility, and stability. Furthermore, when combining the auto-ignition composition within a silicone matrix, the resultant cushion not only serves to provide improved predictability of performance of the cushioned gas generant, it also provides gas from a cushion that was previously inert during the combustion reaction. As a result, relatively less gas generant is required to produce the necessary amounts of gas upon activation of the associated gas generator. Other polymeric binders that are contemplated include polyvinylchloride, EPDM, and other rubbers.

It will be appreciated that cushion 33 may also be positioned anywhere within the inflator 10, and may provide a resilient support wherever required therein. Accordingly, the shape of the cushion 33 is not limited to the exemplary structure shown. In still a further advantage, the cushion is made from a lightweight material rather than a typical wire mesh material, thereby reducing the overall weight of the gas generator 10 or gas generating system 10 associated therewith. In still yet another advantage, the overall safety of the gas generator 10 is improved because of the more efficient heat transfer between the cushion 33 and the housing 11 of the inflator 10. As a result, the present invention provides improved management of the gas generating composition 28 in the event of a fire.

The cushion 33 may be formed by mixing a desired amount of the auto-ignition composition into a desired amount of uncured silicone or any other polymeric binder. The chemical constituents of the present compositions may be provided by known suppliers such as Aldrich or Fischer. The oxidizer, such as a chlorate selected from potassium chlorate or potassium perchlorate, for example, and nitrocellulose are mixed into the silicone. The silicone may then be finally mixed to a substantially homogeneous mixture, and cured according to manufacturer instructions. Silicone is readily available and may for example be provided by companies such as Shin-Etsu of Japan.

Other auto-ignition compositions may also be entrained within silicone as described above. For example, as described in co-owned and co-pending U.S. patent application Ser. Nos. 11/218,191, 11/497,149, and 11/479,493, herein incorporated by reference in their entirety, auto-ignition compositions may also contain potassium chlorate and a secondary oxidizer such as potassium perchlorate, if desired; and one or more carboxylic acids such as D,L-tartaric acid and a secondary fuel if desired. As further described in co-owned and co-pending U.S. patent application Ser. No. 11/656,319, herein incorporated by reference in its entirety, auto-ignition compositions of the present invention may also contain a fuel selected from amides, imides, metal amine-based fuels, and mixtures thereof; ammonium nitrate; and a metal oxide such as copper oxide. As further described in co-owned and co-pending U.S. application Ser. No. 12/002,701, herein incorporated by reference in its entirety, auto-ignition compositions containing metal perchlorates, such as potassium perchlorate, at about 10-90 weight percent of the composition, and a fuel component of cellulose acetate butyrate (CAB) and nitroguanidine (NQ) that when taken together are provided at about 10-90 weight percent of the composition, and, a first additive of molybdenum trioxide is provided at about 0.1-3 wt % of the total auto-ignition composition. Other auto-ignition compositions such as carbohydrates and potassium chlorate may also be used in accordance with the present invention. It will be appreciated that the auto-ignition compositions of the present invention are mixed with the polymeric binder such as silicone, and cured and formed into a propellant cushion as described above. Accordingly, it is believed that any auto-ignition composition known for its utility within a gas generator, that auto-ignites at or below about 250 C, and more preferably below 200 C, and even more preferably between 150-200 C, may be mixed in with the polymeric binder to form the cushion 33, in accordance with the present invention.

A partitioning assembly 26 is positioned proximate second end 17, and preferably comprises a substantially cylindrical base member 27 and a cap 29. Base member 27 and cap 29 define a second combustion chamber 35, that at least partially encases a second quantity of propellant 38, preferably in both tablet and wafer form. Base member 27 and second end closure 34 may be the same piece, as in one preferred embodiment, or a plurality of separate, attached pieces might be used. In a preferred embodiment, partitioning assembly 26 is formed structurally independent from inflator body 11. Partitioning assembly 26 is an independent piece having no physical attachment with the longitudinal sidewall of inflator body 11. During assembly of inflator 10, partitioning assembly 26 is slid into position in inflator body 11, and second end 17 is crimped inwardly to secure assembly 26 therein. Thus, other than securing second end closure 34, no modifications are made to inflator body 11 to accommodate or otherwise secure the components defining second combustion chamber 35.

Cap 29 preferably includes a plurality of apertures 30 that can connect second chamber 35 with plenum 21 (as well as first chamber 25, since plenum 21 and chamber 25 are fluidly connected and partially coextensive). In a preferred embodiment, a foil or burst shim (not shown) is placed across apertures 30 to block fluid communications between the two chambers. It should be appreciated, however, that the foil or burst shim is positioned and/or manufactured such that it will not burst inwardly, i.e. in the direction of second end 17 during combustion of propellant in chamber 25. Combustion of propellant in second chamber 35, on the other hand, is capable of bursting the foil or shim outwardly, allowing the combustion products in chamber 35 to escape to plenum 21/first chamber 25, and thereby discharge from inflator body 11. The preferred foils and shims, and the described methods of mounting them are all known in the art. By fluidly isolating first and second chambers 25 and 35, sympathetic ignition of the propellant in chamber 35 during combustion of the propellant in chamber 25 can be avoided, as described herein. The outer diameter of base member 27 is preferably substantially equal to the inner diameter of inflator body 11, such that base member 27 is nested therein, i.e. fits relatively snugly. Because both second end closure 34 and inflator body 11 are preferably substantially cylindrical, the two components are preferably axially aligned. One or more autoignition tablets 50 may be placed in inflator 10, allowing ignition of the gas generant materials upon external heating in a manner well known in the art.

In one embodiment, wafers 28b are positioned in a stack in plenum 21. Again, the cushion 33, is positioned adjacent the stack 28b, and biases the entire stack 28b toward first end 15. Wafers 28b, in turn, preferably bias disk 32 against tablets 28a, preventing tablets 28a from being jostled while the inflator is idle for long periods, helping avoid mechanical degradation of tablets 28a.

The inflator 10 described herein may be altered in design depending on application requirements. Nevertheless, the cushion or propellant restraint 33, in accordance with the present invention is provided in any inflator design, and biased against at least one propellant thereby providing a cushioning effect as formally realized by metallic cushions for example.

In a typical inflatable restraint system design, inflator 10 is connected to an electrical activation system that includes a crash sensor, of which there are many well-known suitable types. In addition, various sensing systems may be incorporated into the vehicle electronics, including seat weight sensors, occupant detection systems, etc. During a typical deployment scenario, an impact or a sudden vehicle deceleration, an activation signal is sent from an onboard vehicle computer to inflator 10. The signal may be sent to either or both of the initiator assemblies housed with inflator 10. Because chamber 25 preferably contains the larger, main charge, the activation signal is typically directed initially to the initiator assembly operably associated with first chamber 25. In certain scenarios, for example with larger occupants, or where occupants are out of a normal seated position in the vehicle, it may be desirable to activate both propellant charges simultaneously. Other scenarios may call for different activation schemes. For instance, certain conditions may make it desirable to fire only the first propellant charge, or sequentially fire both charges, with varying time delays between the two events. Once an electrical activation signal is sent to the initiator associated with first chamber 25, combustion of booster propellant 14 in sub-chamber 25a is initiated. The flame front and/or hot combustion gases from booster 14 subsequently traverse disk 18, initiating combustion of propellant tablets 28a in chamber 25b. The burning of tablets 28a produces inflation gas that flows rapidly out inflation apertures 40, initiating filling of an associated airbag. A cylindrical, metallic mesh filter 16 is preferably positioned in inflator body 11, and filters slag produced by the combustion of the compounds therein, also serving as a heat sink to reduce the temperature of the inflation gas. Combustion of tablets 28a initiates combustion of wafers 28b, preferably made from the same or similar material as tablets 28a, providing a sustained burn that delivers a relatively constant supply of gas to the associated airbag via plenum 21 and apertures 40. When desired, an electrical activation signal is sent to the initiator operably associated with second chamber 35, containing a gas generant composition 38 that is preferably similar to the composition in chamber 25. Rapid creation of gas in chamber 35 causes a rapid rise in the gas pressure therein, outwardly bursting the foil or shim (not shown) that covers apertures 30, in cap 29. The gas is subsequently discharged from inflator 10 via plenum 21 and apertures 40. Activation of the gas generant in chamber 35 can take place before, during, or after an activation signal is sent to initiator assembly 12, operably associated with chamber 25.

Because both chambers 25 and 35 discharge inflation gas through plenum 21, the present invention provides different operating advantages over many earlier designs wherein separate plenums are used for each combustion chamber. By discharging inflation gases from both combustion chambers 25 and 35 through plenum 21, the inflation profile characteristics across the length and width of an associated airbag can be improved as compared to earlier multi-chamber designs wherein the combustion chambers discharge via separate plenums. In addition, the use of a partitioning assembly structurally independent from the inflator body sidewalls allows the inflator to be constructed without crimping or otherwise modifying the inflator body itself. Moreover, because inflator 10 utilizes a plenum that is coextensive with a first of the combustion chambers, inflator 10 has a simpler design than multi-chamber inflators utilizing combustion chambers that are both partitioned from a common plenum. Inflator body 11 utilizes no attached internal partitions, and can therefore be manufactured without the need for strengthening to compensate for weakening caused by partition attachment. These and other advantages reduce the cost, manufacturing complexity, size and weight of the inflator.

Figure 2:
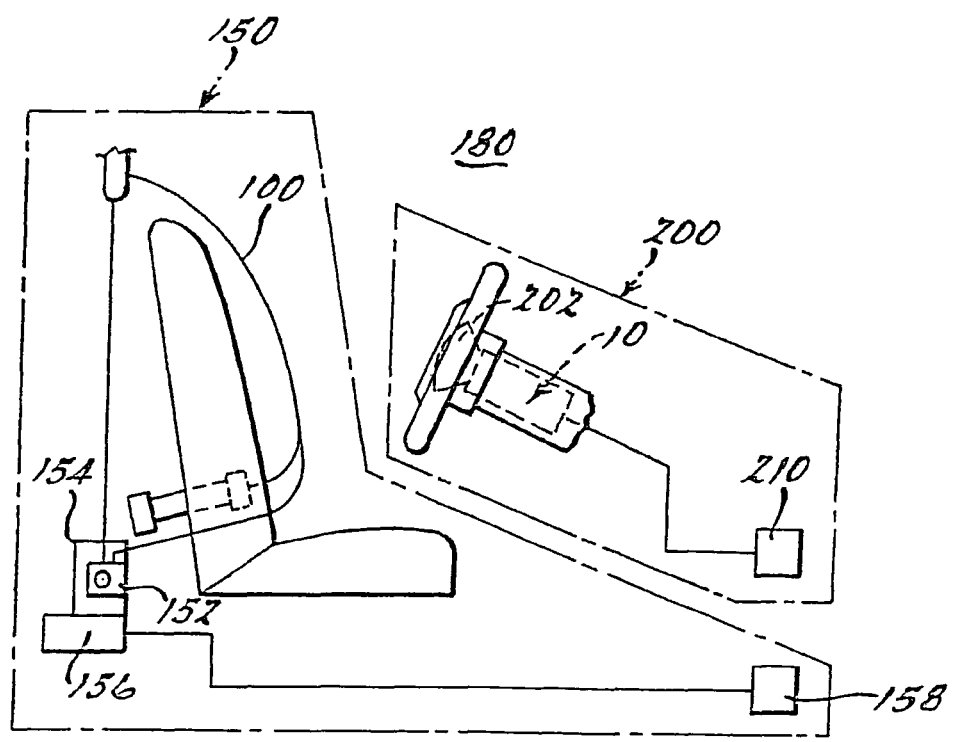
FIG. 2 is a schematic view of an exemplary gas generating system, a vehicle occupant protection system, in accordance with the present invention.

Referring now to FIG. 2, the exemplary inflator 10 described above may also be incorporated into an airbag system 200. Airbag system 200 includes at least one airbag 202 and an inflator 10 containing a gas generant composition 12 in accordance with the present invention, coupled to airbag 202 so as to enable fluid communication with an interior of the airbag. Airbag system 200 may also include (or be in communication with) a crash event sensor 210. Crash event sensor 210 includes a known crash sensor algorithm that signals actuation of airbag system 200 via, for example, activation of airbag inflator 10 in the event of a collision.

Referring again to FIG. 2, airbag system 200 may also be incorporated into a broader, more comprehensive vehicle occupant restraint system 180 including additional elements such as a safety belt assembly 150. FIG. 2 shows a schematic diagram of one exemplary embodiment of such a restraint system. Safety belt assembly 150 includes a safety belt housing 152 and a safety belt 100 extending from housing 152. A safety belt retractor mechanism 154 (for example, a spring-loaded mechanism) may be coupled to an end portion of the belt. In addition, a safety belt pretensioner 156 containing propellant 12 may be coupled to belt retractor mechanism 154 to actuate the retractor mechanism in the event of a collision. Typical seat belt retractor mechanisms which may be used in conjunction with the safety belt embodiments of the present invention are described in U.S. Pat. Nos. 5,743,480, 5,553,803, 5,667,161, 5,451,008, 4,558,832 and 4,597,546, incorporated herein by reference. Illustrative examples of typical pretensioners with which the safety belt embodiments of the present invention may be combined are described in U.S. Pat. Nos. 6,505,790 and 6,419,177, incorporated herein by reference.

Safety belt assembly 150 may also include (or be in communication with) a crash event sensor 158 (for example, an inertia sensor or an accelerometer) including a known crash sensor algorithm that signals actuation of belt pretensioner 156 via, for example, activation of a pyrotechnic igniter (not shown) incorporated into the pretensioner. U.S. Pat. Nos. 6,505,790 and 6,419,177, previously incorporated herein by reference, provide illustrative examples of pretensioners actuated in such a manner.

It should be appreciated that gas generator 10, safety belt assembly 150, airbag system 200, and more broadly, vehicle occupant protection system 180 exemplify but do not limit gas generating systems contemplated in accordance with the present invention.

The present description is for illustrative purposes only, and should not be construed to limit the breadth of the present invention in any way. Thus, those skilled in the art will appreciate that various modifications could be made to the presently disclosed embodiments without departing from the intended spirit and scope of the present invention. Other aspects, features and advantages will be apparent upon an examination of the attached drawing figures and appended claims.

What is claimed is:

1. A gas generator comprising:
   a housing having a first end and a second end;
   an auto-ignition composition comprising nitrocellulose, a polymeric binder and an oxidizer;
   a gas generating composition formed as a plurality of tablets,
   wherein said auto-ignition composition is contained within a resilient cushion for cushioning of said gas generating composition and, said cushion is axially spaced from said first end and said second end in physical communication with at least one of said plurality of tablets.

2. The gas generator of claim 1 wherein said oxidizer is provided at about 20 to about 60 weight percent of the total auto-ignition composition.

3. The gas generator of claim 1 wherein said oxidizer is selected from metal and nonmetal perchlorates, nitrates, nitrites, and oxides, basic metal nitrates, and mixtures thereof.

4. The gas generator of claim 1 wherein said nitrocellulose is provided at about 20 to about 80 weight percent of the total auto-ignition composition.

5. The gas generator of claim 1 wherein said polymeric binder is provided at about 20 to about 60 weight percent of the total auto-ignition composition.

6. The gas generator of claim 1 wherein said auto-ignition composition further comprises a desiccating material selected from synthetic zeolites, calcium oxide, calcium sulfate, and mixtures thereof.

7. The gas generator of claim 6 wherein said desiccating material is provided at about 0.1 to about 50 weight percent of the total auto-ignition composition.

8. The gas generator of claim 3 wherein said oxidizer is selected from phase stabilized ammonium nitrate, ammonium perchlorate, potassium chlorate, potassium perchlorate, strontium nitrate, potassium nitrate; potassium nitrite; basic copper nitrate; iron oxide, copper oxide; and mixtures thereof.

9. The gas generator of claim 1 wherein said polymeric binder is selected from silicone.

10. The gas generator of claim 1 wherein said auto-ignition composition contains about 20 to about 80 weight percent of nitrocellulose, about 20 to about 60 weight percent silicone, about 20 to about 60 weight percent of an oxidizer, and about 0.1 to about 50 weight percent of a desiccating material, said percents stated by weight of the total auto-ignition composition.

11. The gas generator of claim 10 wherein said auto-ignition composition contains about 20 to about 60 weight percent of potassium perchlorate and about 0.1 to 50 weight percent of zeolite.

12. A vehicle occupant protection system comprising the gas generator of claim 1.

13. A gas generator comprising:
   an auto-ignition composition comprising nitrocellulose, silicone, and an oxidizer selected from metal chlorates and perchlorates, and mixtures thereof;
   a gas generating composition formed as a plurality of tablets,
   wherein said auto-ignition composition is entrained within a resilient cushion for cushioning of said gas generating composition to inhibit fracture of said plurality of tablets.

14. The gas generator of claim 13 wherein said oxidizer is provided at about 20 to about 60 weight percent of the total auto-ignition composition.

15. The gas generator of claim 13 wherein said oxidizer is selected from potassium chlorate, potassium perchlorate, and mixtures thereof.

16. The gas generator of claim 13 wherein said nitrocellulose is provided at about 20 to about 80 weight percent of the total auto-ignition composition.

17. The gas generator of claim 13 wherein said silicone is provided at about 20 to about 60 weight percent of the total auto-ignition composition.

18. The gas generator of claim 13 wherein said auto-ignition composition further comprises a desiccating material selected from synthetic zeolites, calcium oxide, calcium sulfate, and mixtures thereof, said desiccating material provided at about 0.1 to about 50 weight percent of the total auto-ignition composition.

19. A gas generator comprising:
   an auto-ignition composition;
   a gas generating composition formed as a plurality of tablets; and
   a polymeric resilient cushion containing said auto-ignition composition mixed therein, said resilient cushion constraining movement of said plurality of tablets.

* * * * *